United States Patent
Cheng et al.

(10) Patent No.: US 8,014,104 B2
(45) Date of Patent: *Sep. 6, 2011

(54) MAGNETIC HEAD/DISK WITH TRANSITION METAL OXYNITRIDE ADHESION/CORROSION BARRIER AND DIAMOND-LIKE CARBON OVERCOAT BILAYER

(75) Inventors: Shide Cheng, Fremont, CA (US); Zhu Feng, Pleasanton, CA (US); Ellis T. Cha, San Ramon, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 836 days.

This patent is subject to a terminal disclaimer.

(21) Appl. No.: 11/726,156

(22) Filed: Mar. 21, 2007

(65) Prior Publication Data

US 2008/0231992 A1    Sep. 25, 2008

(51) Int. Cl.
*G11B 5/255* (2006.01)
*G11B 5/72* (2006.01)

(52) U.S. Cl. ............ 360/235.1; 360/122; 360/135; 428/814; 428/833.2

(58) Field of Classification Search .......... None
See application file for complete search history.

(56) References Cited

U.S. PATENT DOCUMENTS

| | | | |
|---|---|---|---|
| 4,861,669 A * | 8/1989 | Gillery | |
| 4,952,904 A * | 8/1990 | Johnson et al. | |
| 5,070,036 A * | 12/1991 | Stevens | |
| 5,227,196 A * | 7/1993 | Itoh | |
| 5,609,948 A * | 3/1997 | David et al. | |
| 6,007,908 A * | 12/1999 | Reece et al. | 428/334 |
| 6,238,803 B1 * | 5/2001 | Fu et al. | |
| 6,296,742 B1 * | 10/2001 | Kouznetsov | |
| 6,517,956 B1 * | 2/2003 | Chen | |
| 6,915,796 B2 * | 7/2005 | Sung | |
| 7,091,541 B2 * | 8/2006 | Natsume et al. | |

(Continued)

FOREIGN PATENT DOCUMENTS

DE    19730884    * 1/1999

(Continued)

OTHER PUBLICATIONS

"Properties and Electrochromic Performances of Titanium Oxynitride Thin Films Prepared by Reactive Sputtering", by C. Rousselot et al., The Electrochemical Society, 203rd Meeting, Paris, France, Apr. 27-May 2, 2003, Abs #1324.

(Continued)

*Primary Examiner* — Craig A. Renner
(74) *Attorney, Agent, or Firm* — Saile Ackerman LLC; Stephen B. Ackerman (57) ABSTRACT

A protective bilayer on a magnetic read/write head or magnetic disk is formed as an adhesion enhancing and corrosion resistant underlayer and a protective diamond-like carbon (DLC) overlayer. The underlayer is a transition metal oxynitride, having the general formula $MeO_xN_y$, where Me represents a single element or an alloy of the following transition metal elements: Ti, Zr, Hf, V, Nb, Ta, Cr, Mo, and W, here x can be within the range between 0 and 3 and y is in the range between approximately 0 and 2. Adjusting the values of x and y contributes to such qualities of the protective bilayer as stress compensation, chemical and mechanical stability and low electrical conductivity. Methods of forming the adhesion layer, include reactive ion sputtering, plasma assisted chemical vapor deposition, pulsed laser deposition and plasma immersion ion implantation.

8 Claims, 6 Drawing Sheets

U.S. PATENT DOCUMENTS

| | | | |
|---|---|---|---|
| 7,782,569 B2 * | 8/2010 | Cheng et al. | 360/235.1 |
| 2002/0134672 A1 * | 9/2002 | Hwang et al. | |
| 2004/0149566 A1 * | 8/2004 | Nyberg et al. | |
| 2005/0045468 A1 * | 3/2005 | Hwang et al. | |
| 2006/0063040 A1 * | 3/2006 | Ishiyama | |
| 2008/0020211 A1 * | 1/2008 | Petrmichl et al. | 428/428 |
| 2008/0176108 A1 * | 7/2008 | Cheng et al. | 428/814 |
| 2008/0187781 A1 * | 8/2008 | Cheng et al. | 428/812 |
| 2010/0310904 A1 * | 12/2010 | Cheng et al. | 428/833.2 |

FOREIGN PATENT DOCUMENTS

| | | | |
|---|---|---|---|
| JP | 2182880 | * | 7/1990 |
| JP | 2220522 | * | 9/1990 |
| JP | 3195301 | * | 8/1991 |
| JP | 4235283 | * | 8/1992 |

OTHER PUBLICATIONS

Co-pending U.S. Appl. No. 11/702,247, filed Feb. 5, 2007, "Magnetic Recording Head and Media Overcoast", assigned to the same assignee as the present application.

Co-pending U.S. Appl. No. 11/655,025, filed Jan. 18, 2007, "Magnetic Recording Head and Media Comprising Aluminum Oxynitride Underlayer and a Diamond-Like Carbon Overcoat", assigned to the same assignee as the present Application.

"Effects of mechanical stress on the resistance of TMR devices", by Y. Liu et al., Jrnl. of Mag. and Mag. Materials, 0304-8853, 2006 Published by Elsevier B.V., 3 pgs.

*Handbook of Plasma Immersion Ion Implantation and Deposition*, Edited by André Anders, John Wiley + Sons Inc. copyright 2000, Index, Preface.

"Control of reactive sputtering processes", by W.D. Sprout et al., Thin Solid Films 491 (2005) 1-17.

"The physiochemical properties of TiOxNy films with controlled oxygen partial pressure", by Min J. Jung et al, Surface + Coatings Technology, Elsevier Science B.V., 2003, 171(2003)71-74.

"Titanium Nitride Films with High Oxygen Concentration", by Simon S. Ang, Jrnl. of Electronics Materials, vol. 17, No. 2, pp. 95-100, 1988.

* cited by examiner

FIG. 1

| | Melting point (°C) | Thermal expansion coefficient (10⁻⁶/°C) | Electrical resistivity (Ohm-cm) | Elastic modulus (GPa) | Hardness (GPa) |
|---|---|---|---|---|---|
| TiN | 2930 | 9.4 | 40x10⁻⁵ | 600 | 19-23 |
| TiO2 | 1825 | 6.8 | 10¹² | 283 | 7-11 |
| CrN | 1500 | 0.5 | 10⁻³ | 120 | 18 |
| Cr2O3 | 2300 | - | insulator | - | 29 |
| TaN | 3300 | - | 74x10⁻⁶ | - | 9.8 |
| Ta2O3 | 1800 | 5.2 | insulator | - | 19.9 |
| DLC | 3500 | 1-2 | 10⁵-10¹¹ | 100-340 | 10-60 |
| a-Si | 1210 | 2.8 | 10⁻⁵-10¹⁰ | - | - |

MAGNETIC HEAD/DISK WITH TRANSITION METAL OXYNITRIDE ADHESION/CORROSION BARRIER AND DIAMOND-LIKE CARBON OVERCOAT BILAYER

RELATED PATENT APPLICATIONS

This application is related to Docket Numbers SM 06-004 and SM 06-006, assigned to the same assignee as the present Application and fully incorporated herein by reference.

BACKGROUND OF THE INVENTION

1. Field of the Invention

This invention relates to the fabrication of hard disk drives (HDD), particularly to a method of protecting a magnetic head and magnetic disks by use of a diamond-like carbon coating on an underlayer that also serves as a corrosion barrier.

2. Description of the Related Art

Reducing the head-to-disk spacing (fly height) between a magnetic read/write head and the surface of a magnetic disk rotating beneath it has been one of the major approaches in achieving ultra-high recording density in a hard disk drive (HDD) storage system. For a commercially available HDD with 160 GBytes capacity, the fly height is on the order of 10 nanometers (nm). Maintaining such a small spacing between a rapidly spinning disk and a read/write head literally flying above it is difficult and an occasional contact between the disk surface and the head is unavoidable. Such contact, when it does occur, can lead to damage to the head and the disk and to the loss of recorded information on the disk. To minimize the head and disk damage, a thin layer of DLC (diamond-like carbon) coating is applied to both the surface of the head and the surface of the disk. This DLC also serves to protect the magnetic materials in the head from corrosion by various elements within the environment. Given the importance of the role of the DLC, it is essential that it is hard, dense and very thin, the thinness being required to satisfy the overall fly height requirement while not using up any of the allotted spacing. Currently a DLC coating between 20-30 angstroms is found in the prior art.

Conventionally, DLC coatings thickness are greater than 50 Å and for the thickness range, there is a high degree of internal stress, leading to poor adhesion with the substrate materials of the head as well as to other substrates to which they may be bonded. Because of high internal stress and thermo stress, an adhesion layer is required. For example, in applications of cutting edges and drilling tools, the DLC thickness is in the micron range, and the working temperature can go up to a few hundreds degrees Celsius, the coefficient of thermo expansion (CTE) of the adhesion layer also plays an important role. For these reasons, in prior arts, Japanese Patents JP 2571957, JP2220522 and JP3195301 have proposed Si, SiOx, SiC and SiNx for this adhesion layer. Itoh et al. (U.S. Pat. No. 5,227,196) discloses a SiNx adhesion layer on an oxide substrate beneath the DLC layer. Various types of adhesion layers are also found in the prior arts. Ishiyama (US Patent Application 2006/0063040) discloses a carbon-based protection layer of hydrogenated carbon nitride for better adhesion. Hwang et al. (US Patent Application 2005/0045468) teaches a Si adhesion layer for a DLC. Hwang et al. (US Patent Application 2002/0134672) discloses Si, $Al_2O_3$, $SiO_2$, or $SiN_x$ as an adhesion layer beneath a DLC layer. David et al. (U.S. Pat. No. 5,609,948) describes a SiC adhesion layer under a DLC layer.

In addition to these cited prior arts, adhesion layers comprising materials other than Si have also been utilized. Natsume et al. (U.S. Pat. No. 7,091,541) discloses the oxynitride TiAlON for an adhesion layer between a capacitor dielectric layer and an electrode. Fu et al. (U.S. Pat. No. 6,238,803) shows a $TiO_xN_y$ barrier layer. Johnson et al. (U.S. Pat. No. 4,952,904) describes a metal oxide adhesion layer between silicon nitride and platinum. Stevens (U.S. Pat. No. 5,070,036) shows metal oxynitride as one of various material regions in a VLSI circuit. Gillery (U.S. Pat. No. 4,861,669) shows a TiON dielectric film.

For magnetic heads, the underlayer should have at least the following properties:

1. Electrical isolation property. For magnetic heads, electrical isolation must be provided for the magnetic metal alloy layers, such as those layers comprising a magnetoresistive read head based on the giant magnetoresistance (GMR) effect, or those comprising a device based on the tunneling magnetoresistive (TMR) effect. Electrical short circuits between these layers and surrounding HDD components will damage the head or similar device. For this reason, the protection layers, especially the underlayer, should be insulating or semi-insulating. However, due to the semiconductor properties of Si, the surface shunting of a Si adhesion layer can introduce noise, such as the so-called popcorn noise, into the GMR or TMR reader.

2. Anti-corrosion property. DLC films, particularly those produced through the filtered cathodic vacuum arc (FCVA) process of the prior art, are often embedded with micro- or nano-particles. These particles can result in pinholes and corrosion of the materials used in forming the magnetically active layers, such as NiFe and NiCoFe. The anti-corrosion property of the underlayer is therefore of crucial importance to maintaining the performance integrity of the sensor.

3. Anti-wear property. With the total thickness of the underlayer and the DLC layer being reduced to the sub-30 angstrom range, literally every atom counts for the protection. Therefore, better anti-wear property is expected if we can put more atoms into the limited film thickness. It is therefore very important that the underlayer has both chemical stability for corrosion protection and high hardness for tribological advantage.

It is the purpose of the present invention to provide a new class of materials with which to form an underlayer, in order to replace the Si and related materials described in the prior art cited above.

SUMMARY OF THE INVENTION

The first object of the present invention is to provide a thin protective layer for a magnetic read/write head or a magnetic recording medium to protect them from inadvertent contact and to provide wear resistance between the head and the medium surface.

The second object of the present invention is to provide such a protective layer formed as a bilayer, wherein an overlayer is primarily a protective layer and an underlayer is primarily an adhesion enhancing layer and a corrosion protection layer.

The third object of the present invention is to provide such a bilayer wherein inherent high resistivity of the underlayer eliminates surface shunting, thereby reducing noise, such as popcorn noise, from the read/write head.

A fourth object of the present invention is to provide such a bilayer wherein the underlayer forms a strong and stable chemical bond with the overlayer.

A fifth object of the present invention is to provide methods for forming a protective bilayer that satisfies all of the above objects.

The objects of this invention will be achieved by the use of a class of materials, the transition metal oxynitrides, of general formula MeO$_x$N$_y$, with "Me" denoting the transition metal, to form the adhesion enhancing and corrosion resistant underlayer of a protective bilayer. Examples of transition metals that will meet the objects of the invention are Ti, Zr, Hf, V, Nb, Ta, Cr, Mo and W in group IIIB, IVB and VB of the periodic table. Transition metal oxynitrides can be effectively bonded to the DLC and to the read/write head substrate as well as the recording media substrate to form a strong and stable bond. It has the requisite chemical and mechanical properties to satisfy the objects of the invention set forth above. Ti, Zr, Hf, V, Nb, Ta, Cr, Mo and W are carbide forming refractory metals that exhibit good adhesion to DLC films. In addition, they have also been shown to have good adhesion to substrate materials used in magnetic read heads and media, such as AlTiC, Al$_2$O$_3$, NiFe and NiFeCo and to a variety of other materials extensively used in the semiconductor industry. For this reason, Ti, Cr and Ta have been widely used as an adhesion layer. Further, the chemical, mechanical and physical properties of the transition metal oxynitrides can be tailored from covalent-bond dominant nitrides to ionic-bond dominant oxides by varying the oxygen and nitrogen concentrations, x and y, in the formula. As an example, TiN is a good material for the adhesion layer, but its electrical resistance (see FIG. 2) is only in the range of $10^{-6}$ Ohm-cm. By introducing oxygen, however, its resistivity can be increased to the range between $10^{+5}$-$10^{+10}$ Ohm-cm (see M. J. Jung et al. "The physiochemical properties of TiO$_x$N$_y$ films with controlled oxygen partial pressure)", Surface Coating Technology 171, pp. 71-74, 2003). Along with this advantageous change in resistivity, the stress of the film will advantageously decrease (S. S. Ang, "Titanium Nitride Films with High Oxygen Concentration" Journal of Electronic Materials, Vol. 17, No. 2, pp. 95-100, 1988).

Figure 1:
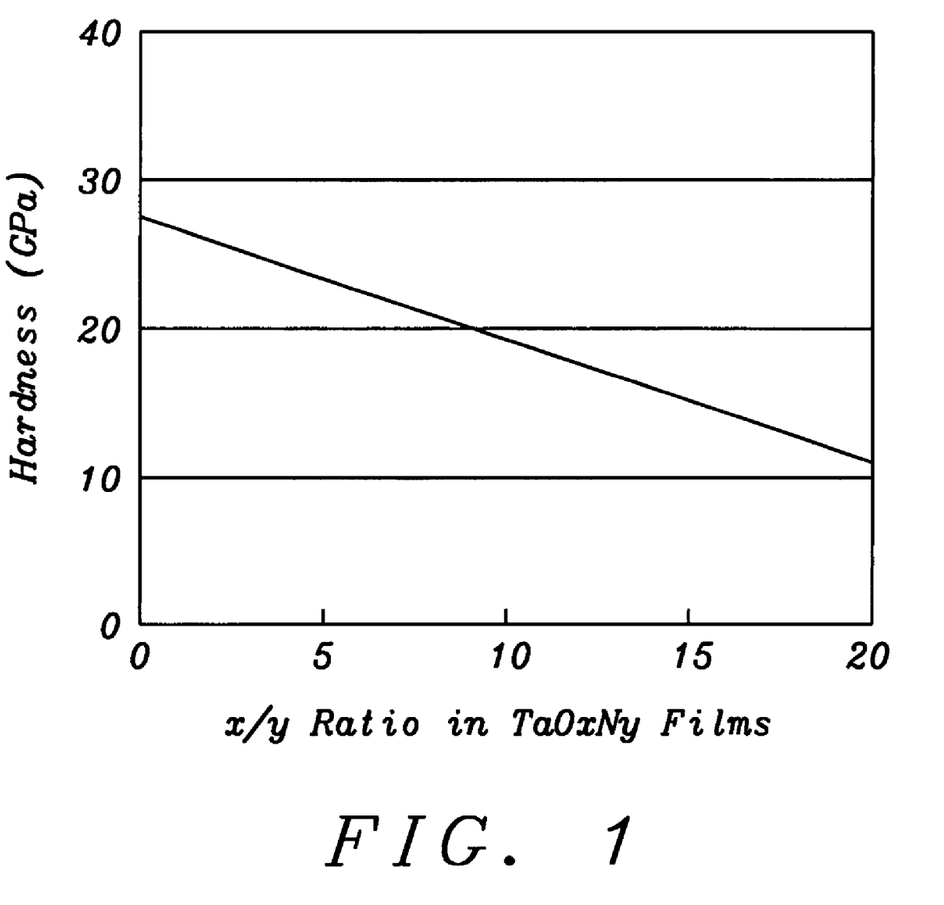
FIG. 1 is a graphical representation of the hardness of tantalum oxynitride as a function of the relative percentages of oxygen and nitrogen.

Another example meeting the objects of the present invention is the class of TaO$_x$N$_y$ films, which, as will be described below, can be prepared by reactive sputtering with an Ar/O$_2$/N$_2$ ion beam and a Ta target. As shown in FIG. 1, increasing the x/y ratio in a film of TaO$_x$N$_y$ from approximately 0 to 20 permits the hardness to be tuned from between approximately 26 GPa to 12 GPa. At the same time, the band-gap energy, E$_g$, increases from approximately 2.7 eV to 4.2 eV. As a result, the resistivity will also increase accordingly. This ability of tuning the film properties by varying the oxygen/nitrogen ratio is a highly advantageous aspect of the invention.

Yet another example is the class of CrO$_x$N$_y$ films, which can be prepared by reactive sputtering of Cr target with Ar/O$_2$/N$_2$. The electrical property of the material varies from conducting to insulating as the CrO$_x$N$_y$ varies from CrN to CrO$_{1.5}$.

A further example is the class MoO$_x$N$_y$, within which an increase in oxygen content in the film decreases the hardness of the film from about 25 GPa to about 5 GPa. At the same time, the Young's modulus also decreases from 250 GPa to about 50 GPa. The stress decreases from about 1.5 GPa to a stress close to zero.

Figure 2:
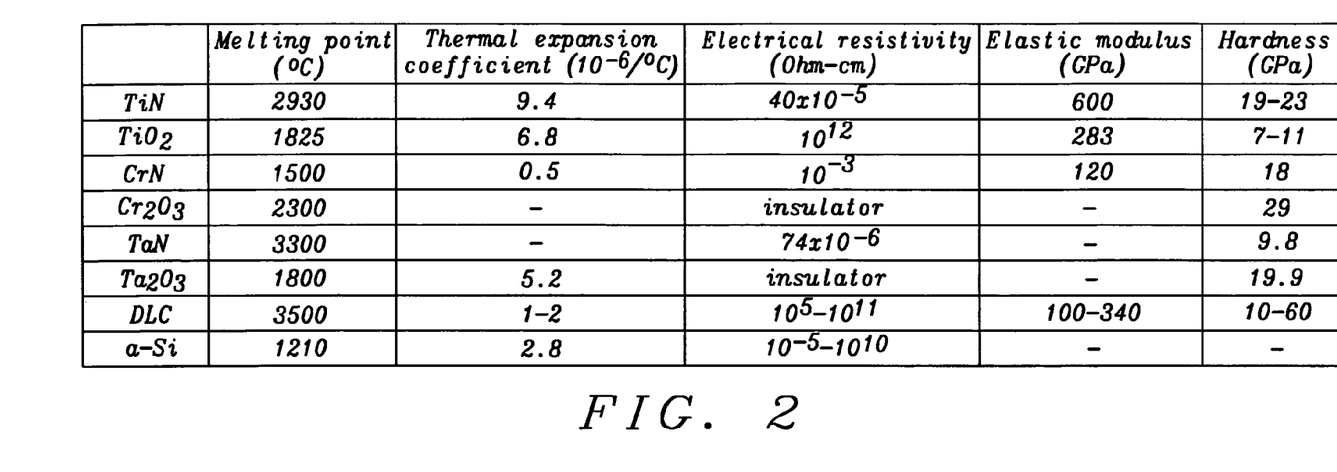
FIG. 2 is a table listing several relevant properties of materials used in forming the read/write head and its protective coatings.

For reference and comparison purposes, FIG. 2 provides a convenient listing of several relevant mechanical and electrical properties of various materials that are used in the fabrication of a magnetic read/write head.

The MeO$_x$N$_y$ underlayer can be prepared by a variety of methods, including:

1. Reactive sputtering of metal, metal oxide, metal nitride or metal oxynitride targets within an Ar/O$_2$/N$_2$ atmosphere.
2. Plasma treatment of metal film with plasma immersion ion implantation (PIII), plasma immersion ion implantation deposition (PIIID).

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein.

DESCRIPTION OF THE PREFERRED EMBODIMENTS

Each of the preferred embodiments of the present invention teaches a method of fabricating a thin protective bilayer over a magnetic read/write head or magnetic recording media wherein the protective bilayer comprises an adhesion enhancing and corrosion resistant underlayer formed as a transition metal oxynitride, MeO$_x$N$_y$ (where Me represents a single transition metal element or an alloy formed with two or more of the following transition metal elements: Ti, Zr, Hf, V, Nb, Ta, Cr, Mo, and W), over which is formed a hard, protective diamond-like carbon (DLC) overlayer (also referred to as an overcoat).

Amorphous Si (a-Si) is widely used as an adhesion layer in the magnetic recording industry to promote the adhesion of a DLC layer to the substrate of a magnetic read/write head. In the prior art, the coating process begins with the cleaning of the head substrate using an Ar$^+$ ion beam. Following this cleaning process, an adhesion layer of amorphous Si is deposited using ion-beam sputtering and then a DLC overlayer is deposited using ion-beam deposition (IBD) or PECVD or, more preferably, deposition by a filtered cathodic vacuum arc (FCVA).

The preferred embodiments of the present invention differ from the IBD deposition of a-Si because a totally different class of materials, the transition metal oxynitrides, are formed to serve as both an adhesion an corrosion protection layer. In the preferred embodiments this layer is formed (on either a head or a recording media) as a layer of $MeO_xN_y$. Me represents a single element or an alloy formed with two or more of the following transition metal elements: Ti, Zr, Hf, V, Nb, Ta, Cr, Mo, and W, in Group IIIB, IVB and VB of the periodic table. The layer can be deposited by reactive ion sputtering, plasma enhanced chemical vapor deposition (PECVD), reactive pulsed laser deposition (PLD) and other methods to be described below.

Figure 3A:
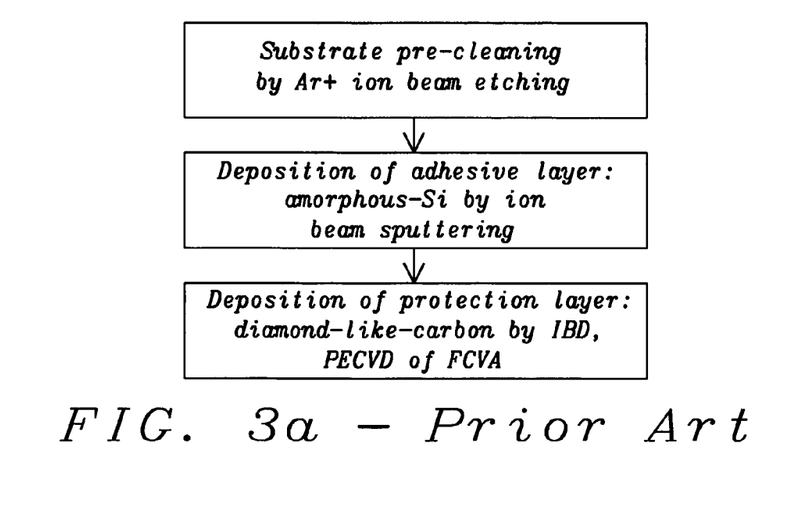
FIGS. 3a and 3b are flow charts of the prior art method of forming a protective bilayer (3a) and the present method of forming the protective bilayer (3b).

Referring to the flow chart of FIG. 3a, there is shown a sequence of three steps that produces the protective bilayer of the prior art.
1. Substrate pre-cleaning using an $Ar^+$ ion beam as an etching mechanism.
2. Deposition of an adhesion underlayer of amorphous silicon (a-Si) using reactive ion sputtering.
3. Deposition of a protective overlayer of DLC, using IBD, PECVD or FCVA.

Figure 3B:
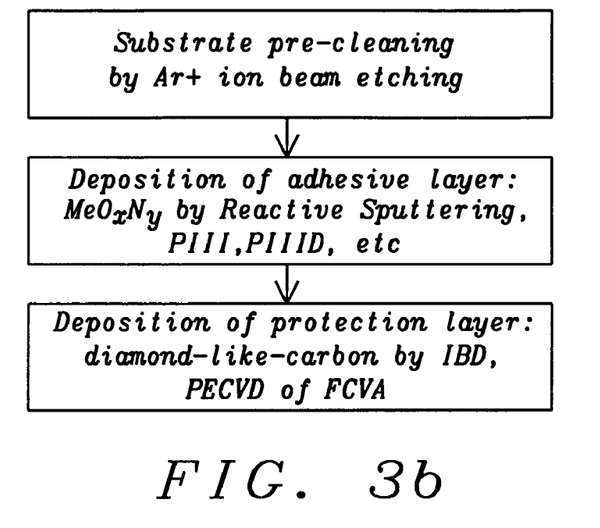

Referring to the flow chart of FIG. 3b, there is shown a sequence of three steps that produces the protective bilayer of the current invention.
1. Substrate (of a head or media) pre-cleaning using an $Ar^+$ ion beam as an etching mechanism.
2. Deposition of an adhesion enhancing and corrosion resistant underlayer of $MeO_xN_y$, using sputtering of a refractory transition metal (Me), or an alloy of such metals, from such metal(s) oxide, metal(s) nitride, or metal(s) oxynitride target within an $Ar/O_2/N_2$ atmosphere or by using plasma immersion ion implantation, plasma immersion ion implantation deposition, or reactive pulsed laser deposition.
3. Deposition of a protective overlayer of DLC, using IBD, PECVD or FCVA.

The following embodiments of the present invention are all methods by which a protective layer can be formed on a magnetic read/write head or a magnetic recording media (typically a disk) that will meet all the objects of the invention set forth above. In all of the embodiments, the protective layer is formed as a bilayer on the disk or on an appropriate substrate surface of the read/write head, such as an air-bearing layer surface (ABS) that has been cleaned by an appropriate method such as Ar ion or $Ar/O_2$ ion beam etching. It is also understood that there is preferably a plurality of read/write heads mounted on a holder and simultaneously treated by the method.

Figure 4:
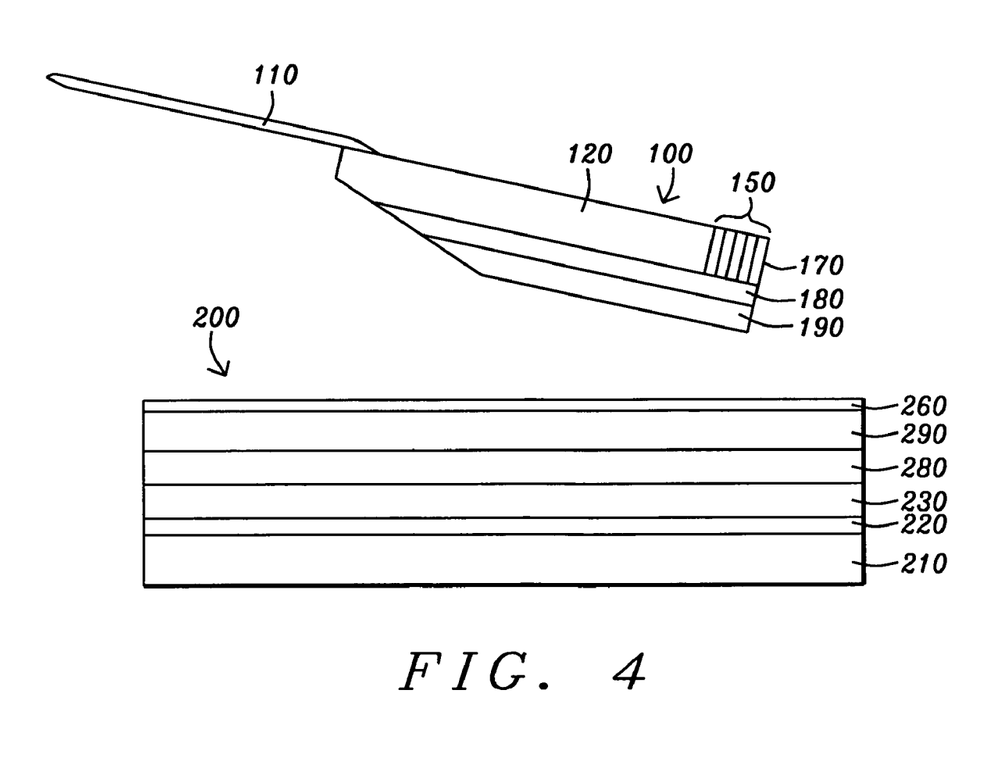
FIG. 4 is a schematic illustration of a slider mounted read/write head of the type on which the protective bilayer of the present invention is to be formed. The slider flies above a rotating magnetic disk of the type also protected by the bilayer of the present invention.

FIG. 4 illustrates a magnetic head-disk interface (not drawn to scale), where a magnetic head slider (100) is mechanically attached to its suspension (110). The slider is built on AlTiC substrate (120) with shielded GMR or TMR reader and writer (150) and an $Al_2O_3$ overcoat (170). The reader shield, the reader, and writer materials are mainly formed of magnetic materials comprising various alloys and compounds of Ni—Fe—Co which are subject to corrosion when exposed to environmental conditions. The slider is coated with the underlayer of the present invention (180) and a DLC overcoat (190).

On the other hand, the magnetic disk (200) is built on a glass or aluminum substrate (210) on top of which is an adhesion layer (220) (not typically of the present invention) and a magnetic layer (230). The surface of the magnetic layer is protected by the adhesion layer (280) and DLC overcoat (290) formed by the method of the present invention. To minimize the abrasion with the slider head, a lube layer (260) is applied on the magnetic disk. The present invention provides the adhesion layer for both the slider (180) and for the magnetic disk (280).

First Preferred Embodiment

Figure 5:
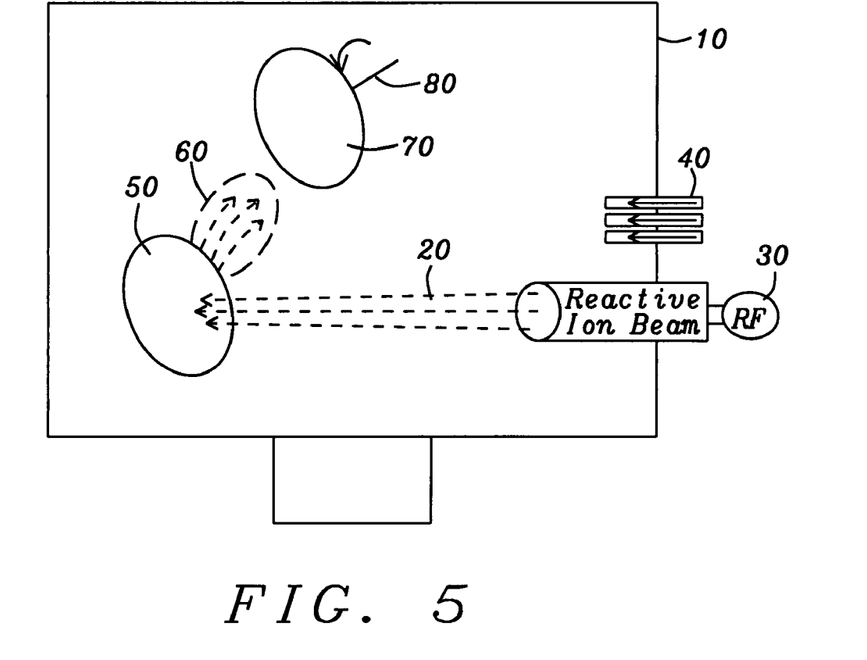
FIG. 5 is a schematic illustration of an apparatus for producing particular preferred embodiments of the invention using reactive ion beam sputtering.

Referring now to FIG. 5, there is shown a schematic perspective drawing of an apparatus within which the protective bilayer of the present invention can be formed on a magnetic read/write head or on the surface of a magnetic recording disk. In this first preferred embodiment, as an example of the method, the adhesion enhancing layer will be formed as a layer of $TiO_xN_y$.

The first preferred embodiment of this invention uses a deposition chamber (10) in which a vacuum of less than approximately $10^{-6}$ Torr has been formed by a turbo pump (not shown). This chamber is substantially a common element in all of the following embodiments. Into this chamber a reactive ion beam, such as an $Ar^+$ beam (20) is injected and directed at a sputtering target of $TiO_2$ (50). The beam is produced by a RF source (30) and accelerated by voltages that produce a beam of ions with a beam voltage between approximately 300 V to 1200 V. Injection ports (40) allow the injection of $O_2$ and $N_2$ gases into the chamber (10) or into the ion source with flow rates between approximately 0 and 20 sccm, and different concentration ratios and for different durations, depending upon the desired x/y ratio in the $TiO_xN_y$ underlayer, for x within the range of approximately 0 to 3 and y within the range of approximately 0 to 2. As noted above, the $Ar^+$ beam is directed at a sputtering target of $TiO_2$ (50) and the sputtered atoms (60) impinge on the device being coated (70) (the deposition target), which can be read/write heads or magnetic disks, a plurality of which are mounted on a rotatable holder (80) that is rotated for uniformity of the deposition. The values of x and y stated above have produced adhesion and corrosion resistant underlayers with electrical resistivity in the range between approximately $10^{-6}$ to $10^{+6}$ Ohm-cm. It is also noted that x and y can be varied as the deposition process proceeds to produce adhesion layers with compositions that are a function of layer thickness. In all the formations of embodiments one through six an overall thickness of the adhesion layer that does not exceed 50 angstroms produces results that meet the objects of the invention. An adhesion layer thickness that is less than 20 angstroms is most preferable although adhesion layers less than 50 angstroms in thickness will meet the objects of the invention. Subsequent to the deposition of the adhesion layer, a layer of DLC (not shown) is formed on the adhesion layer using the methods cited above to produce a bonded bilayer that meets the objects of the invention.

It is noted that the above layer formation in which Ti was the transition metal and $TiO_2$ was the target could proceed in substantially identical manner using a target comprising compounds of Me, where Me represents a single element or an alloy formed with two or more of the following transition metal elements: Ti, Zr, Hf, V, Nb, Ta, Cr, Mo, and W.

Subsequent to the formation of the underlayer, a DLC overlayer is formed on the underlayer using methods cited above.

In a second version of the same first embodiment, the apparatus of FIG. 5 is used as above, but the sputtering target material (50) is TiN. The $Ar^+$ beam (20) is injected using an RF source and accelerating voltages that produce a beam voltage between approximately 300 V and 1200 V and the $O_2$ and $N_2$ gases are injected into the chamber (10) with flow rates between approximately 0 and 20 sccm, and at different concentration ratios and for different durations, depending upon the desired x/y ratio of the $TiO_xN_y$ underlayer, for x within the range of approximately 0 to 3 and y within the range of approximately 0 to 2. As the $Ar^+$ beam strikes the sputtering target of TiN (50) the resulting sputtered Ti and N atoms (60) impinge of the read/write heads or disks (70) in the presence of the injected $O_2$ and $N_2$ gases to produce the desired $TiO_xN_y$ adhesion layer. A plurality of the read/write heads or a magnetic disk are mounted on a rotatable holder (80) that is rotated for uniformity of the deposition.

It is also noted that x and y can be varied as the deposition process proceeds to produce adhesion layers with compositions that are a function of layer thickness. In all these formations an overall thickness of the layer that does not exceed approximately 50 angstroms produces results that meet the objects of the invention. A layer thickness that is less than 20 angstroms is most preferable.

It is noted that the above layer formation in which Ti was the transition metal and the sputtering target was TiN could proceed in substantially identical manner using a target comprising compounds of Me, where Me represents a single element or an alloy formed with two or more of the following transition metal elements: Ti, Zr, Hf, V, Nb, Ta, Cr, Mo, and W.

Subsequent to the formation of the underlayer, a DLC overlayer is formed on the underlayer using methods cited above.

Second Preferred Embodiment

Figure 6:
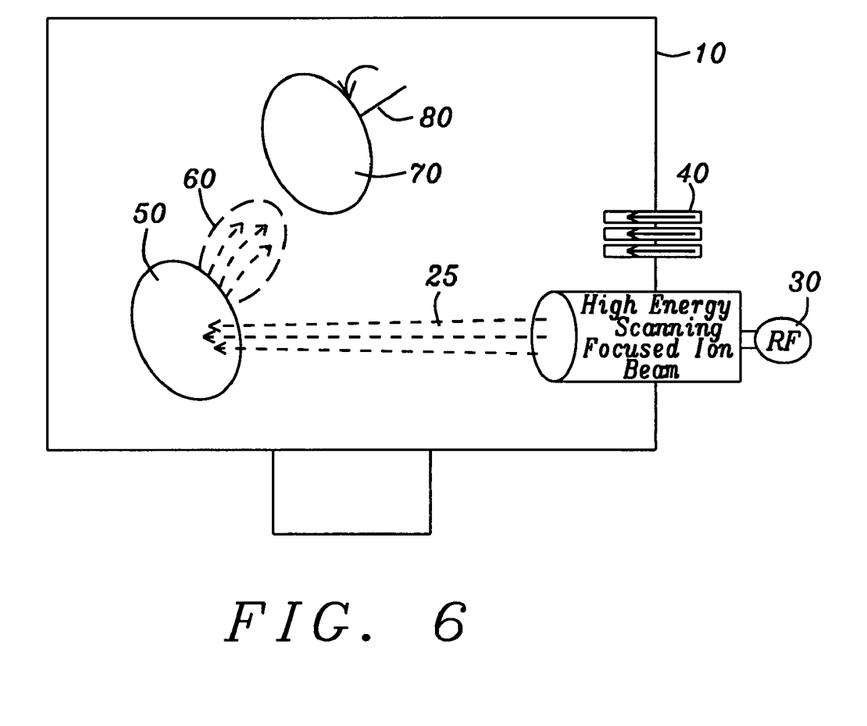
FIG. 6 is a schematic illustration of an apparatus for producing particular preferred embodiments of the invention using a scanned focused ion beam.

The second preferred embodiment of this invention uses the apparatus of FIG. 6, which is similar to that of FIG. 5 in that it comprises a deposition chamber (10) into which a reactive ion beam (20), such as an $Ar^+$ ion beam, can be injected and directed at a Ti sputtering target (50), while injection ports (40) allow the injection of $O_2$ and $N_2$ gases with flow rates between approximately 0 and 20 sccm, and different concentration ratios and for different durations, depending upon the desired form of the x/y ratio in the $TiO_xN_y$ underlayer, for x within the range of approximately 0 to 3 and y is within the range of approximately 0 to 2. In this embodiment, however, the reactive ion beam is a high energy scanning, focused $Ar^+$ ion beam (25) that is directed at a sputtering target of Ti (50) and the sputtered atoms (60) impinge of the target read/write heads or a magnetic disk (70), which are mounted on a rotatable holder that is rotated for uniformity of the deposition. To avoid poisoning the target and to eliminate hysteresis effects associated with the deposition, there is used a high energy scanning focused ion beam as described by T. Nyberg et al. (US Patent Application 2004/0149566A1) which is incorporated by reference here in its entirety. It is also noted that x and y can be varied as the deposition process proceeds to produce adhesion layers with compositions that are a function of layer thickness. In all these formations an overall thickness of the layer that does not exceed 50 angstroms produces results that meet the objects of the invention. A layer thickness that is less than 20 angstroms is most preferable.

It is noted that the above layer formation in which Ti was the transition metal could proceed in substantially identical manner using a target comprising compounds of Me, where Me represents a single element or an alloy formed with two or more of the following transition metal elements: Ti, Zr, Hf, V, Nb, Ta, Cr, Mo, and W.

Subsequent to the formation of the underlayer, a DLC overlayer is formed on the underlayer using methods cited above.

Third Preferred Embodiment

Figure 7:
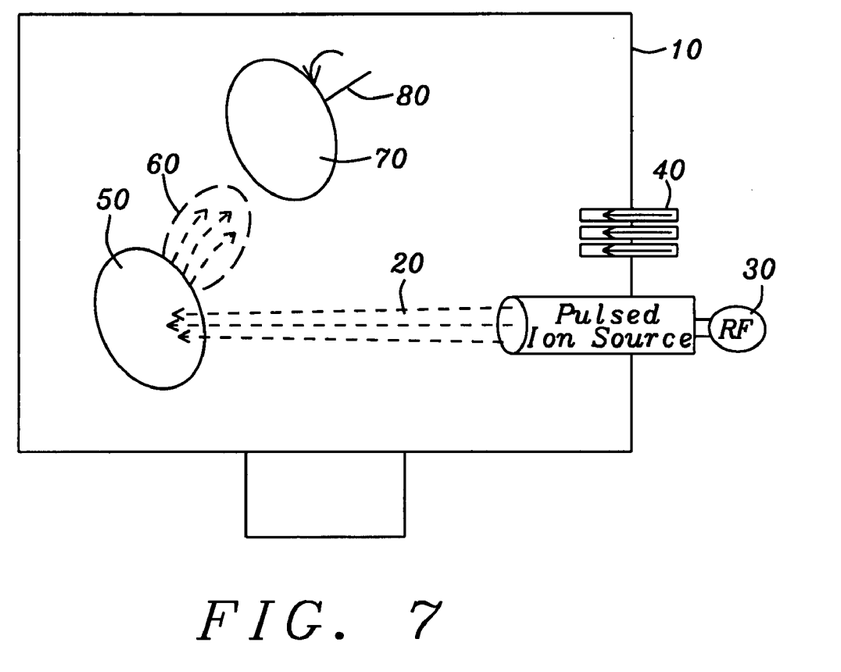
FIG. 7 is a schematic illustration of an apparatus for producing particular preferred embodiments of the invention using a pulsed ion beam.

The third preferred embodiment of this invention uses the apparatus of FIG. 7, which comprises a deposition chamber (10) into which a reactive ion beam, such as an $Ar^+$ ion beam can be injected and directed at a Ti sputtering target (50) while injection ports (40) allow the injection of $O_2$ and $N_2$ gases with flow rates between approximately 0 and 20 sccm, and different concentration ratios and for different durations, depending upon the desired x/y ratio in the $TiO_xN_y$ underlayer, for x within the range of 0 to 3 and y is within the range of 0 to 2. In this embodiment, however, the ion beam (20) is a pulsed $Ar^+$ ion source with high instantaneous power, that is directed at a sputtering target of Ti (50) and the sputtered atoms (60) impinge on the deposition target read/write heads (70), which are mounted on a rotatable holder that is rotated for uniformity of the deposition. To avoid poisoning the target and to eliminate hysteresis effects associated with the deposition, there is used a high instantaneous power pulsed ion source as described by V. Kousnetsov et al. (U.S. Pat. No. 6,296,742) which is incorporated by reference here in its entirety. It is also noted that x and y can be varied as the deposition process proceeds to produce adhesion layers with compositions that are a function of layer thickness. In all these formations an overall thickness of the layer that does not exceed 50 angstroms produces results that meet the objects of the invention. A layer thickness that is less than 20 angstroms is most preferable.

It is noted that the above layer formation in which Ti was the transition metal could proceed in substantially identical manner using a target comprising compounds of Me, where Me represents a single element or an alloy formed with two or more of the following transition metal elements: Ti, Zr, Hf, V, Nb, Ta, Cr, Mo, and W.

Subsequent to the formation of the underlayer, a DLC overlayer is formed on the underlayer using methods cited above.

Fourth Preferred Embodiment

Figure 8:
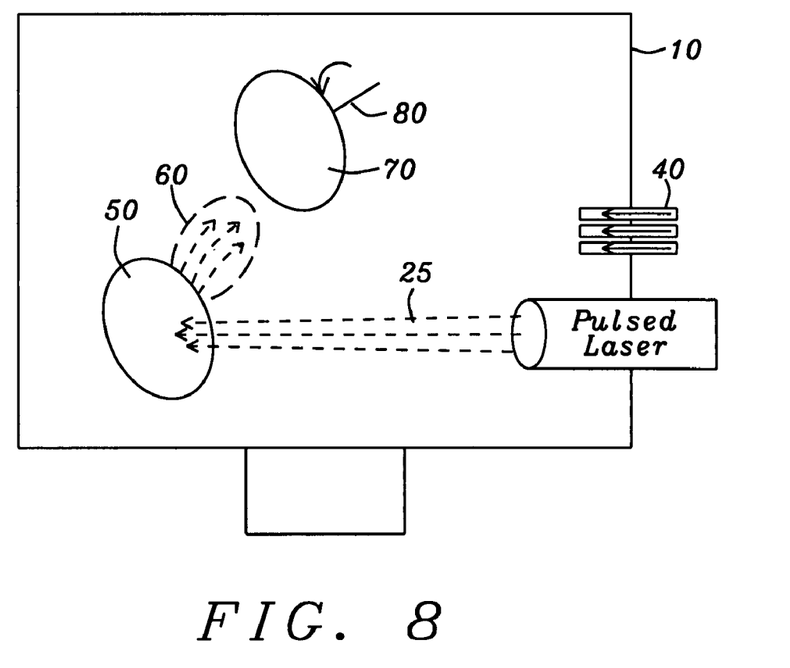
FIG. 8 is a schematic illustration of an apparatus for producing a preferred embodiment of the invention using a high energy laser.

The fourth preferred embodiment of this invention uses the apparatus of FIG. 8, which comprises a deposition chamber (10) into which a high energy pulsed laser can direct a beam of high energy, pulsed electromagnetic radiation (25) at a Ti target (50) while injection ports (40) allow the injection of $O_2$ and $N_2$ gases with flow rates between approximately 0 and 20 sccm, and different concentrations and for different durations, depending upon the desired x/y ratio in the $TiO_xN_y$ underlayer. In this embodiment, the electromagnetic radiation can be produced by a high energy pulsed laser such as a $CO_2$ laser, an excimer laser, etc and the atoms ejected (60) by the laser beam impinge of the target read/write heads or magnetic disks (70), which are mounted on a rotatable holder that is rotated for uniformity of the deposition. Values of x within the range of approximately 0 to 3 and y within the range of approximately 0 to 2 have been obtained and have produced adhesion layers meeting the objects of the invention. It is also noted that x and y can be varied as the deposition process proceeds to produce adhesion layers with compositions that are a function of layer thickness. In all these formations an overall thickness of the layer that does not exceed 50 angstroms produces results that meet the objects of the invention. A layer thickness that is less than 20 angstroms is most preferable.

It is noted that the above layer formation in which Ti was the transition metal could proceed in substantially identical manner using a target comprising compounds of Me, where Me represents a single element or an alloy formed with two or more of the following transition metal elements: Ti, Zr, Hf, V, Nb, Ta, Cr, Mo, and W.

Subsequent to the formation of the underlayer, a DLC overlayer is formed on the underlayer using methods cited above.

Fifth Preferred Embodiment

Figure 9:
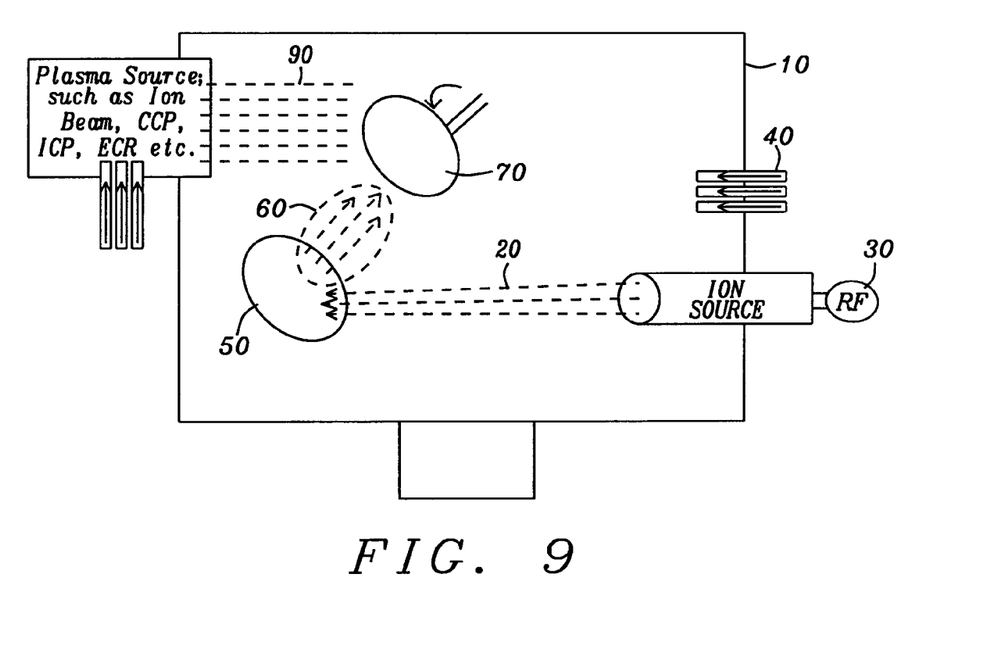
FIG. 9 is a schematic illustration of an apparatus for producing a preferred embodiment of the invention using an ion beam to sputter in the presence of a plasma or followed by a treatment in the plasma.

Referring to FIG. 9, there is shown a schematic perspective drawing of an apparatus within which there is carried out a two-step process of forming the protective bilayer on a magnetic read/write head in accord with a fifth preferred embodiment.

The fifth preferred embodiment of this invention uses the deposition chamber (10) of FIG. 7 into which a reactive ion beam such as an $Ar^+$ beam (20) is injected. The beam is produced by a RF source (30) and accelerated by voltages that produce an ion beam with a beam voltage in the range from approximately 300 V to 1200 V. The beam (20) impinges on a Ti sputtering target (50) causing Ti atoms to be sputtered onto a plurality of magnetic read/write heads or magnetic disks (70) mounted on a rotatable fixture that is rotated for uniform deposition.

After deposition of the Ti sputtered film on the read/write heads or magnetic media, the Ti film is then exposed to a plasma (90) of $Ar/O_2$ and $Ar/N_2$ gases that is injected into the chamber (10) with different concentrations and durations of the $O_2$ and $N_2$ respectively, depending upon the desired value of the x/y ratio in the $TiO_xN_y$. Values of x within the range of approximately 0 to 3 and y within the range of approximately 0 to 2 have been obtained and have produced adhesion layers meeting the objects of the invention. It is also noted that x and y can be varied as the deposition process proceeds to produce adhesion layers with compositions that are a function of layer thickness. In all these formations an overall thickness of the layer that does not exceed 50 angstroms produces results that meet the objects of the invention. A layer thickness that is less than 20 angstroms is most preferable.

It is noted that the above layer formation in which Ti was the transition metal could proceed in substantially identical manner using a target comprising compounds of Me, where Me represents a single element or an alloy formed with two or more of the following transition metal elements: Ti, Zr, Hf, V, Nb, Ta, Cr, Mo, and W.

The plasma can be generated and applied by the use of any of a number of methods known in the art, such as plasma formation by an ion beam, formation and application of a capacitively coupled plasma (CCP), formation of an electron cyclotron resonance (ECR) plasma or formation and application of an inductively coupled plasma (ICP).

Subsequent to the formation of the underlayer, a DLC overlayer is formed on the underlayer using methods cited above.

Sixth Preferred Embodiment

The sixth preferred embodiment of this invention is substantially the same as the fifth embodiment, except that the injection of the plasma occurs while the sputtered beam strikes the read/write heads or disks. The embodiment uses the deposition chamber (10) of FIG. 9 into which a reactive ion beam such as an $Ar^+$ beam (20) is injected. The beam is produced by a RF source (30) and accelerated by voltages that produce an ion beam with a beam voltage in the range from approximately 300 V to 1200 V. The beam (20) impinges on a Ti sputtering target (50) causing Ti atoms to be sputtered onto a plurality of magnetic read/write heads mounted on a rotatable fixture for uniform deposition.

The deposition of the Ti sputtered film on the read/write heads or the magnetic disk (70) is carried out in the presence of a plasma (90) of $Ar/O_2$ and $Ar/N_2$ gases with different concentrations and durations of the $O_2$ and $N_2$ respectively (or sequentially exposed to a plasma (90) of $Ar/O_2$ gases and $Ar/N_2$ gases with different durations of the exposure), that is formed within the chamber (10), depending upon the desired ratio x/y in the $TiO_xN_y$. The plasma can be generated and applied by the use of any of a number of methods known in the art, such as plasma formation by an ion beam, formation and application of a capacitively coupled plasma (CCP), formation of an electron cyclotron resonance (ECR) plasma or formation and application of an inductively coupled plasma (ICP).

Values of x within the range of approximately 0 to 3 and y within the range of approximately 0 to 2, have been obtained and have produced adhesion enhancing and corrosion resistant underlayers meeting the objects of the invention. It is also noted that x and y can be varied as the plasma process proceeds to produce adhesion layers with compositions that are a function of layer thickness. In all these formations an overall thickness of the layer that does not exceed 50 angstroms produces results that meet the objects of the invention. A layer thickness that is less than 20 angstroms is most preferable.

It is noted that the above layer formation in which Ti was the transition metal could proceed in substantially identical manner using a target comprising compounds of Me, where Me represents a single element or an alloy formed with two or more of the following transition metal elements: Ti, Zr, Hf, V, Nb, Ta, Cr, Mo, and W.

Subsequent to the formation of the underlayer, a DLC overlayer is formed on the underlayer using methods cited above.

As is understood by a person skilled in the art, the preferred embodiments of the present invention are illustrative of the present invention rather than being limiting of the present invention. Revisions and modifications may be made to methods, processes, materials, structures, and dimensions through which is formed a protective bilayer, including a transition metal oxynitride adhesion enhancing and corrosion resistant underlayer, on a magnetic read/write head, while still providing such a protective bilayer, formed in accord with the present invention as defined by the appended claims.

What is claimed is:

1. A protected magnetic read/write head or recording disk comprising:
    the read/write head or recording disk;
    a protective bilayer formed on the read/write head or recording disk, the bilayer further comprising:
        an adhesion enhancing and corrosion resistant underlayer formed as a layer of transition metal oxynitride, $MeO_xN_y$, on a cleaned substrate surface of the read/write head or recording disk;
        a DLC outer layer formed on the underlayer.
2. The protected read/write head or recording disk of claim 1 wherein Me represents a single element or an alloy formed with two or more of the following transition metal elements: Ti, Zr, Hf, V, Nb, Ta, Cr, Mo, and W.

3. The protected read/write head or recording disk of claim 1 wherein x is greater than 0 to approximately 3 and y is greater than 0 to approximately 2.

4. The protected read/write head or recording disk of claim 1 wherein said underlayer is formed to a thickness less than approximately 50 angstroms.

5. The protected read/write head or recording disk of claim 1 wherein said underlayer is formed to a thickness less than approximately 20 angstroms.

6. The protected read/write head or recording disk of claim 1 wherein said bilayer is formed to a thickness less than approximately 50 angstroms.

7. The protected read/write head or recording disk of claim 1 wherein x and y vary as a function of the underlayer thickness.

8. The protected read/write head or recording disk of claim 1 wherein the underlayer is formed by a process of reactive pulsed laser deposition, reactive ion sputtering, pulsed reactive ion sputtering or scanning focused reactive ion beam sputtering, either in the presence of oxygen and nitrogen gases or oxygen and nitrogen plasmas.

* * * * *